(12) United States Patent
Koshi et al.

(10) Patent No.: US 6,862,384 B2
(45) Date of Patent: Mar. 1, 2005

(54) LIGHT SOURCE-OPTICAL FIBER COUPLER

(75) Inventors: Hiroshi Koshi, Osaka (JP); Yasuji Sasaki, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 10/007,667

(22) Filed: Dec. 10, 2001

(65) Prior Publication Data

US 2002/0159695 A1 Oct. 31, 2002

(30) Foreign Application Priority Data

Dec. 11, 2000 (JP) .................................. 2000-376324

(51) Int. Cl.⁷ .............................................. G02B 6/32
(52) U.S. Cl. ............................ 385/34; 385/31; 385/92; 385/93
(58) Field of Search ............................ 385/31–35, 88, 385/92, 93

(56) References Cited

U.S. PATENT DOCUMENTS

| | | | |
|---|---|---|---|
| 5,087,109 A | * | 2/1992 | Ishizuka et al. ............... 385/34 |
| 5,351,330 A | * | 9/1994 | Jongewaard ................... 385/93 |
| 5,353,294 A | * | 10/1994 | Shigeno ........................ 372/43 |
| 6,418,251 B1 | * | 7/2002 | Boscha ......................... 385/31 |

* cited by examiner

Primary Examiner—Edward J. Glick
Assistant Examiner—Therese Barber
(74) Attorney, Agent, or Firm—Whitham, Curtis & Christofferson, P.C.

(57) ABSTRACT

A light source-optical fiber coupler constituted by: a light source (such as a semiconductor laser chip 10); and a gradient index rod lens 14 for coupling diffuse luminous flux emitted from the light source to an end surface of an optical fiber (such as a single mode optical fiber 16). The gradient index rod lens has a light source side end surface shaped like a convex spherical surface, and an optical fiber side end surface shaped like a flat surface. The gradient index rod lens is retained by the housing in the condition that the light source (laser chip) and the gradient index rod lens are disposed close to each other. The distance between a surface of the laser chip and an end surface of the gradient index rod lens is preferably selected to be not larger than 0.3 mm and more preferably in a range of from about 0.2 mm to about 0.25 mm.

11 Claims, 3 Drawing Sheets

LIGHT SOURCE-OPTICAL FIBER COUPLER

BACKGROUND OF THE INVENTION

The present invention relates to a light source-optical fiber coupler having a gradient index rod lens for coupling light emitted from a light source to an end surface of an optical fiber. More specifically, it relates to a light source-optical fiber coupler which has a gradient index rod lens having a light source side end surface shaped like a convex spherical surface, and an optical fiber side end surface shaped like a flat surface, and in which the light source and the gradient index rod lens are disposed close to each other to thereby make reduction in size possible.

In optical communication or the like, diffuse luminous flux emitted from a light source such as a semiconductor laser is transmitted to a core of an optical fiber by a lens. Examples of the lens heretofore used for such optical coupling are a spherical lens, an aspherical lens, a gradient index rod lens, and so on.

Although the spherical lens can be produced most inexpensively, the spherical lens is insufficient to optically couple a semiconductor laser to a single mode optical fiber with a small loss. This is because the single mode optical fiber has such a small core diameter that very small lens aberration is required for providing high optical coupling efficiency. Therefore, at present, an aspherical lens is generally used for high coupling efficiency. Therefore, at present, an aspherical lens is generally used as a high coupling lens.

On the other hand, when a gradient index rod lens is used, at least one end surface is often processed into a spherical surface because a high numerical aperture (NA) is required for coupling light emitted from a semiconductor laser. This is based on the thought that condensing power is obtained by a convex spherical surface and that aberration generated in the convex spherical surface is cancelled by the refractive-index distribution of the gradient index rod lens.

FIG. 6 shows an example of the background art. A semiconductor laser used as a light source has a package mount structure (such as a TO type structure) in which a laser chip 10 is covered with a cap having a window portion so that laser light is emitted while transmitted through cover glass 12 in the window portion. The light emitted from the laser is focused onto an end surface of a single mode optical fiber 16 by a gradient index rod lens 14. In this example, the gradient index rod lens 14 is assembled so that a semiconductor laser side end surface 14a is shaped like a convex spherical surface and an optical fiber side end surface 14b is shaped like a flat surface.

For production of an aspherical lens, however, a mold is required in accordance with the kind of the lens. A heat-resistant material and a super-precision process are required for the production. Accordingly, particularly in the case of large item small volume production, there is a problem that the cost of the lens becomes high.

On the contrary, a gradient index rod lens has an advantage in that the lens is small in size and can be produced inexpensively and easily. On the other hand, since a semiconductor laser is easy to handle at the time of assembling, a semiconductor laser having a structure to be mounted in a package is often used. In this case, however, the distance between a laser chip surface (emission position) and an end surface of the gradient index rod lens cannot be made shorter than a specific value because of the presence of cover glass 12. The shortest distance is generally in a range of from about 0.6 to about 0.7 mm. For this reason, coupling loss is increased because of eclipse of light emitted from the semiconductor laser, so that it is difficult to couple the semiconductor laser to the single mode optical fiber efficiently.

SUMMARY OF THE INVENTION

An object of the present invention is to provide a light source-optical fiber coupler which can optically couple a semiconductor laser to a single mode optical fiber with a small loss and which can be produced inexpensively, easily and in a small size.

The present invention provides a light source-optical fiber coupler constituted by: a light source; and a gradient index rod lens for coupling diffuse luminous flux emitted from the light source to an end surface of an optical fiber. In the light source-optical fiber coupler, the gradient index rod lens has a light source side end surface shaped like a convex spherical surface, and an optical fiber side end surface shaped like a flat surface; and the gradient index rod lens has a structure in which the gradient index rod lens is retained by a housing in a state that the gradient index rod lens is disposed close to a laser chip of a semiconductor laser used as the light source and in which the optical fiber can be retained by the housing.

In the present invention, a semiconductor laser is generally used as the light source. When a single mode optical fiber having a small core diameter is used as the optical fiber which is a partner of optical coupling, a high-efficient optical coupling effect is generated particularly remarkably. In the present invention, because the semiconductor laser side end surface is shaped like a convex spherical surface and the optical fiber end surface is shaped like a flat surface, the distance between the laser chip surface and the end surface of the gradient index rod lens is shortened to thereby reduce eclipse of light emitted from the semiconductor laser to attain enhancement of coupling efficiency. Hence, miniaturization of an optical module can be achieved by use of such a small-diameter gradient index rod lens.

In the present invention, the distance between the light source (laser chip) and the end surface of the gradient index rod lens is preferably selected to be not larger than 3 mm and more preferably in a range of from 0.2 to 0.25 mm. This is because coupling loss can be minimized when the distance is in the aforementioned range.

As a practical optical module; the housing includes a laser holder for retaining the semiconductor laser, and a lens holder for retaining the gradient index rod lens; and a position of the semiconductor laser and a position of the gradient index rod lens can be adjusted in an axial direction of an optical axis as well as in an in-plane direction perpendicular to the optical axis and are limited by the laser holder so that a distance between the laser chip and the gradient index rod lens is not smaller than a predetermined value when the position of the laser chip and the position of the gradient index rod lens are adjusted in the axial direction.

The present disclosure relates to the subject matter contained in Japanese patent application No.2000-376324 (filed on Dec. 11, 2001), which is expressly incorporated herein by reference in its entirety.

DESCRIPTION OF THE PREFERRED EMBODIMENT

Figure 1:
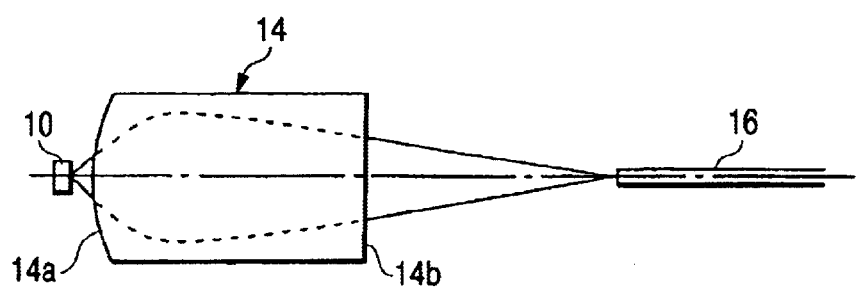
FIG. 1 is a basic configuration view of a light source-optical fiber coupler according to the present invention.

FIG. 1 is a basic configuration view showing a light source-optical fiber coupler according to the present invention. Light (diffuse luminous flux) emitted from a semiconductor laser (laser chip 10) is coupled to an end surface of a single mode optical fiber 16 by a gradient index rod lens 14. Here, the gradient index rod lens 14 is disposed so that the lens 14 has a semiconductor laser side end surface 14a shaped like a convex spherical surface, and an optical fiber side end surface 14b shaped like a flat surface. The semiconductor laser is formed as a structure in which neither cover glass nor cap is provided. Hence, the semiconductor laser is retained by the housing (not shown) in a state in which the laser chip 10 and the gradient index rod lens 14 are disposed close to each other. In addition, the optical fiber can be retained by the housing.

To make the semiconductor laser side numerical aperture $NA_2$ large, the laser chip-rod lens distance $L_1$ is selected to be not larger than 0.3 mm (to an extent that the distance is long enough not to make contact between the laser chip and the rod lens) and especially preferably a range of from about 0.2 mm to about 0.25 mm. The effective radius $r_0$ of the lens is preferably selected to be in a range of from about 0.3 mm to about 1.0 mm. The curvature radius $R_2$ of the spherical surface is preferably selected to be in a range of from about 1.2 mm to about 2.0 mm. The reason why the semiconductor laser side numerical aperture $NA_2$ is made large is that the lens is adapted to the characteristic of the semiconductor laser. The numerical aperture $NA_2$ is preferably selected to be in a range of from about 0.5 to about 0.7. The reason why the effective radius $r_0$ of the lens is selected to be in a range of from 0.3 mm to 1.0 mm is that the radius is made as small as possible and that the radius of 0.3 mm is substantially the limit in processing of such a spherical surface. The curvature radius $R_2$ of the spherical surface is selected to be in a range of from 1.2 mm to 2.0 mm in accordance with the effective radius $r_0$ of the lens.

The refractive index distribution of the gradient index rod lens viewed radially is given by the expression:

$$n(r)^2 = n_0^2 \cdot \{1 - (g \cdot r)^2 + h_4(g \cdot r)^4 + h_6(g \cdot r)^6 + h_8(g \cdot r)^8 + \ldots\}$$

in which r is a distance from the center axis, n(r) is a refractive index in a position at the distance r from the center axis, $n_0$ is a refractive index on the center axis, g is a second-order refractive index distribution coefficient, and $h_4, h_6, h_8, \ldots$ are higher-order refractive index distribution coefficients respectively.

An example will be described below. The laser chip to rod lens distance $L_1$ was selected to be 0.2 mm. The single mode optical fiber side numerical aperture NA ($=NA_1$) was selected to be 0.15. The distance $L_2$ between the end surface of the rod lens and the single mode optical fiber was selected to be about 4.5 mm. The values of $n_0$ and g were given so that the refractive index $n_0$ on the center axis of the gradient index rod lens was in a range of from 1.5 to 1.8 and so that $n_0 \cdot g \cdot r_0$ was in a range of from about 0.40 to about 0.65. Hence, the curvature radius of the spherical surface which was an end surface of the lens was changed so that light ray aberration is optimized so as to be minimized. In this manner, lens length z, higher-order refractive index distribution coefficients $h_4$, $h_6$ and $h_8$ and semiconductor laser side numerical aperture $NA_2$ could be calculated. Results were shown in Table 1.

TABLE 1

| lens | $R_1$ (mm) | $R_2$ (mm) | Z (mm) | $NA_2$ | $h_4$ | $h_6$ | $h_8$ |
|---|---|---|---|---|---|---|---|
| 00 | 0 | 0 | 4.039 | 0.485 | 0.5711 | 1.478 | −13.20 |
| 11 | 0 | −2.0 | 4.018 | 0.526 | 0.6063 | 1.722 | −14.13 |
| 12 | 0 | −1.8 | 4.015 | 0.532 | 0.6113 | 1.760 | −14.20 |
| 13 | 0 | −1.6 | 4.011 | 0.539 | 0.6179 | 1.821 | −14.31 |
| 14 | 0 | −1.4 | 4.007 | 0.549 | 0.6269 | 1.906 | −14.38 |
| 15 | 0 | −1.2 | 4.002 | 0.565 | 0.6401 | 2.035 | −14.27 |

When a gradient index rod lens having an external size responding to the numeral 13 in Table 1 was used in the condition that the laser chip to rod lens distance $L_1$ and the rod lens to optical fiber distance $L_2$ were 0.2 mm and 4.7 mm respectively, coupling loss was 1.59 dB (coupling efficiency: 69.4%). On the contrary, when the laser chip to rod lens distance $L_1$ and the rod lens to optical fiber distance $L_2$ were 0.65 mm and 6.0 mm respectively (background-art configuration), coupling loss was 2.60 dB (coupling efficiency: 54.9%). That is, coupling loss and coupling efficiency in the configuration of the present invention were observed to be enhanced by about 1 dB and about 15% respectively compared with those in the background-art configuration.

Figure 2:
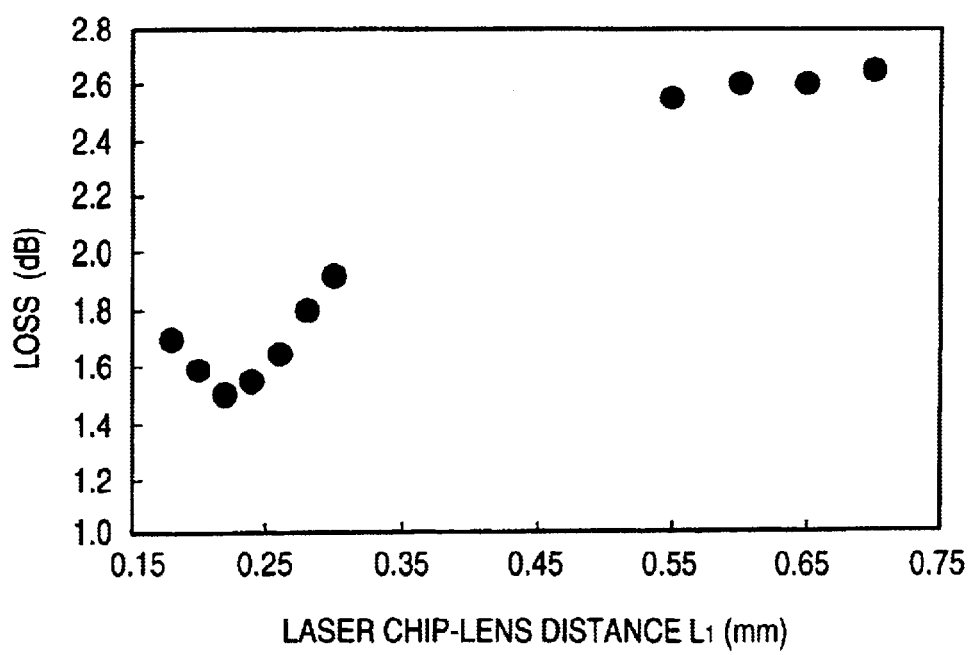
FIG. 2 is a graph showing the relationship between light source-lens distance $L_1$ and coupling loss in the light source-optical fiber coupler.

In a similar manner, FIG. 2 shows results of measurement of coupling loss (dB) versus the laser chip to lens distance $L_1$ in the case where the same lens as described above is used. It is clear from the results that the laser chip to lens distance $L_1$ is preferably selected to be not larger than 0.3 mm and more preferably in a range of from about 0.20 mm to about 0.25 mm. When the laser chip to lens distance $L_1$ is in a range of from 0.2 mm to 0.25 mm, coupling loss is minimized. In this case, it is apparent that alignment in the axial direction (z direction) need not be performed because coupling loss would little change even if the distance $L_1$ changed by the order of tens of microns. In this case, assembling can be made by means of butt joint in terms of mechanical accuracy. Because there is however specific tolerance in the lens length, the light source-optical fiber coupler may be provided as a module structure in which alignment can be made in the axial direction (z direction) if coupling loss is selected to be as low as possible.

Figure 3:
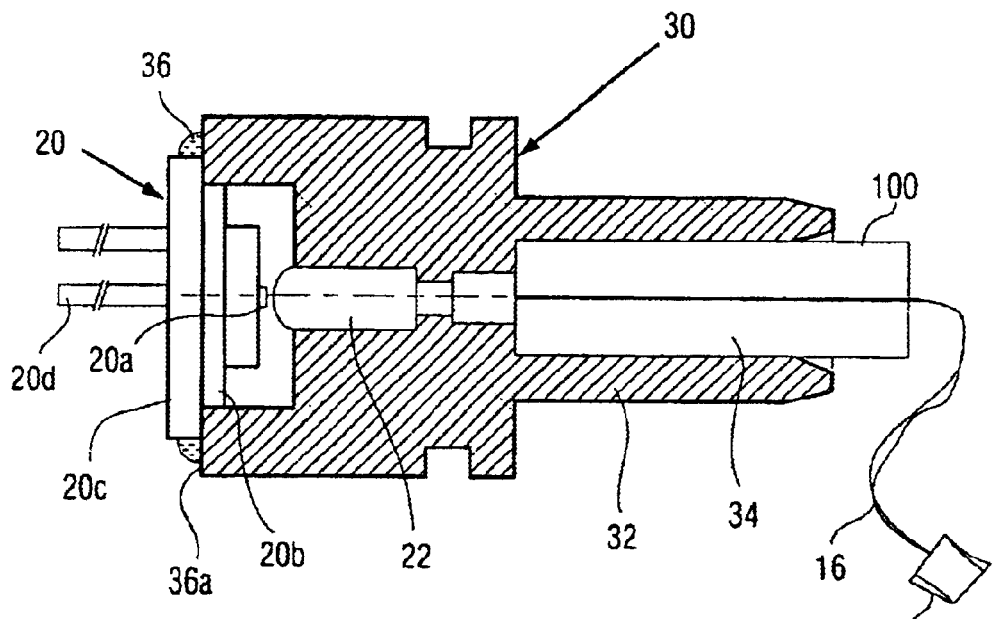
FIG. 3 is a structural explanatory view showing a specific example of the light source-optical fiber coupler according to the present invention.

FIG. 3 shows a specific example of the light source-optical fiber coupler. The light source-optical fiber coupler has a semiconductor laser 20, a gradient index rod lens 22, and a housing 30 for retaining the semiconductor laser 20 and the gradient index rod lens 22 and retaining a ferrule 100 of an optical plug which is a coupling partner to be fitted to the housing 30. The ferrule 100 holds the optical fiber 16, and the optical fiber can have a connector 102. The fiber and connector 16 comprise a structure In which an insertable/detachable receptacle connector to which a fiber is mated, as known in the art. The light source-optical fiber coupler has a receptacle type structure in which the semiconductor laser 20 and the single mode optical fiber retained by the ferrule are optically coupled to each other by the gradient index rod lens 22 when connection between the single mode optical fiber and the ferrule is performed in the optical plug.

As described above, the semiconductor laser 10 has a structure in which neither cover glass nor cap is provided. A laser chip (device body) 20a is mounted on a chip carrier (heat sink) 20b. The chip carrier 20b is further mounted on a base portion 20c. Leads 20d pass through the base portion 20c. In this manner, the gradient index rod lens 22 can be disposed extremely near the laser chip 20a which serves as an emission point.

Here, the housing 30 is an integrally molded article of resin in which a plurality of holes different in internal diameter are formed along the center axis so as to lie in a line to thereby form a through-hole structure. While the semiconductor laser 20 is retained by one end portion (left end portion in FIG. 3) 30a of the housing 30, the gradient index rod lens 22 is attached to an inner central portion of the housing. A receptacle portion 32 is provided in a region of from the central portion of the housing 30 to an opposite end portion (right end portion in FIG. 3) of the housing 30. The receptacle portion 32 is a portion having a bore (cavity portion) 34 into which the ferrule of the optical plug as the coupling partner can be just fitted.

As described above, the gradient index rod lens 22 incorporated in the light source-optical fiber coupler has a semiconductor laser side end surface shaped like a convex spherical surface, and an optical fiber side end surface shaped like a flat surface. The semiconductor laser side end surface is disposed close to the emission point of the laser chip 20a (for example, with the laser chip to lens distance ranging from about 0.20 mm to about 0.25 mm). The periphery of the gradient index rod lens 22 is fixed by an adhesive agent or the like in the condition that the gradient index rod lens 22 is inserted in the through-hole.

The semiconductor laser 20 is aligned and connected to the housing 30 which incorporates the gradient index rod lens 22 as described above. The semiconductor laser 20 is combined with the housing 30 so that the base portion 20c of the semiconductor laser 20 abuts against the end portion 30a of the housing 30 in the condition that the ferrule of the optical plug is attached into the receptacle portion 32 of the housing 30. Then, the semiconductor laser 20 is aligned (in planes perpendicular to the optical axis, that is, in x and y directions) while light emitted from the semiconductor laser 20 is monitored through the single mode optical fiber of the optical fiber. The periphery of the base portion 20c is fixed by an adhesive agent 36 of resin in the condition that the semiconductor laser 20 is positioned in the aforementioned manner. This is a structure example in which butt joint between the base portion 20c and the end surface 30a is used so that alignment in the direction (z direction) of the optical axis is omitted.

Figure 4:
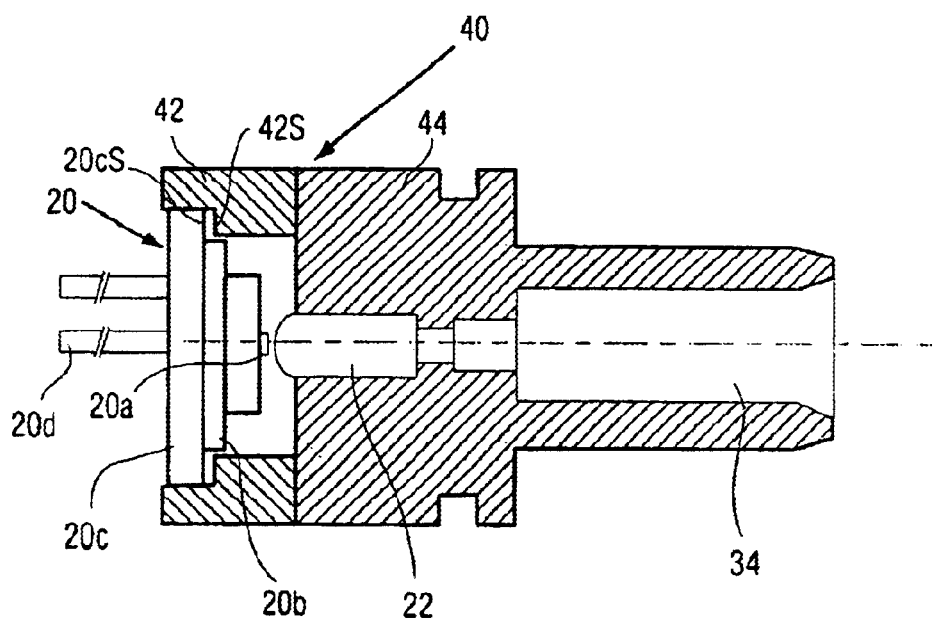
FIG. 4 is a structural explanatory view showing another specific example of the light source-optical fiber coupler according to the present invention.
Figure 5:
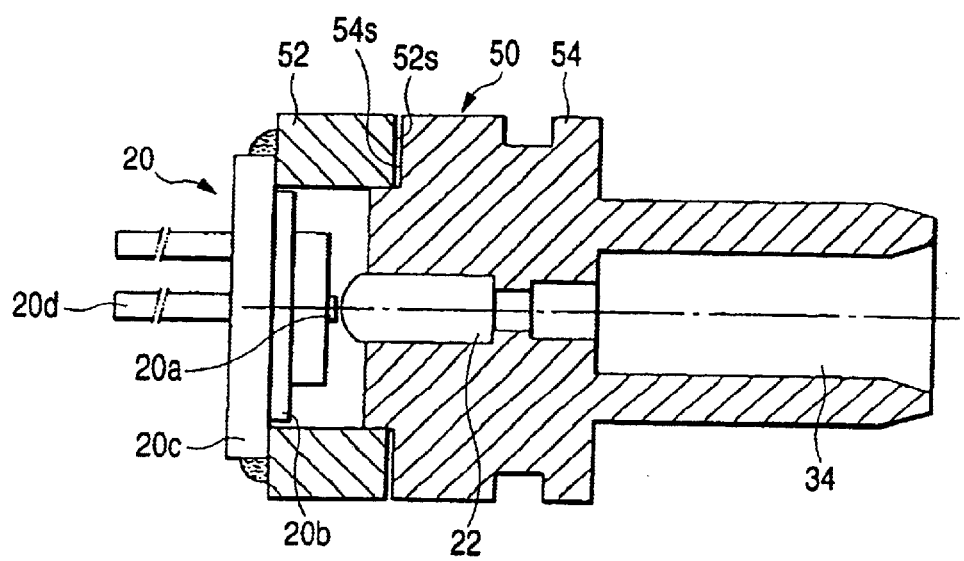
FIG. 5 is a structural explanatory view showing a further specific example of the light source-optical fiber coupler according to the present invention.
Figure 6:
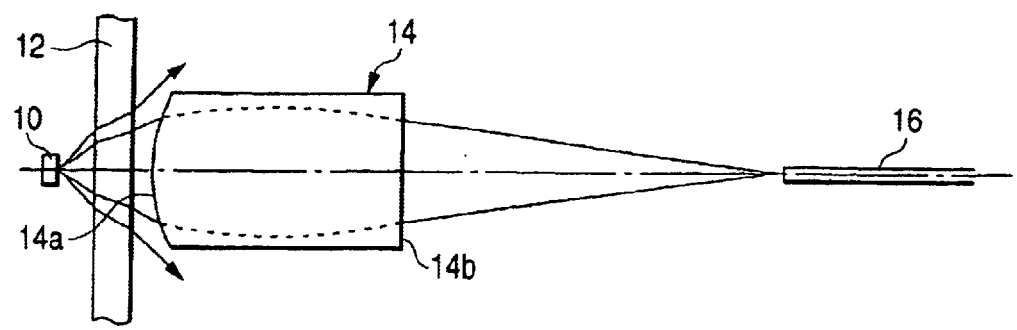
FIG. 6 is an explanatory view of a background-art light source-optical fiber coupling system.

FIGS. 4 and 5 are explanatory views showing further specific examples of the light source-optical fiber coupler. Because the basic configuration in FIGS. 4 and 5 is the same as that in FIG. 2, identical parts are referenced correspondingly for the sake of simplification of description. Each of these examples shows the structure in which alignment in the direction (z direction) of the optical axis can be made.

In FIG. 4, a housing 40 has a separate structure in which a laser holder 42 for retaining the semiconductor laser and a lens holder 44 for retaining the rod lens 22 are provided separately. A part (right portion in FIG. 4) of the lens holder 44 serves as a receptacle portion. The receptacle portion is a portion having a bore (cavity portion) 34 into which the ferrule of the optical plug as a coupling partner can be just fitted.

Alignment in the x-y plane is performed by butt joint between an end surface of the laser holder 42 and an end surface of the lens holder 44. Alignment in the z direction is performed by insertion of the semiconductor laser 20 in the laser holder 42. In practice, in the condition that the ferrule of the optical plug is attached into the bore 34 of the lens holder 44, the laser holder 42 is brought into contact with an end surface of the lens holder 44 to perform alignment in the x and y directions. On the other hand, the base portion 20c of the semiconductor laser 20 is inserted in an inner circumferential step portion of the laser holder 42 and put out and in to thereby perform alignment in the z direction. The position of the semiconductor laser 20 is adjusted while light emitted from the semiconductor laser 20 is monitored through the single mode optical fiber of the optical plug. In the condition that the semiconductor laser 20 is positioned as described above, fixation between the laser holder and the lens holder, and fixation between the semiconductor laser and the laser holder are performed by means of welding or the like.

Also in FIG. 5, a housing 50 has a separate structure in which a laser holder 52 for retaining the semiconductor laser and a lens holder 54 for retaining the rod lens 22 are provided separately. Also in this example, a part (right portion in FIG. 5) of the lens holder 54 serves as a receptacle portion. The receptacle portion is a portion having a bore (cavity portion) 34 into which the ferrule of the optical plug as a coupling partner can be just fitted.

The laser holder 52 is fitted to the lens holder 54 to thereby perform alignment in the z direction. The semiconductor laser 20 is butt-jointed to the laser holder 52 to thereby perform alignment in the x-y plane. In practice, in the condition that the ferrule of the optical plug is attached into the bore 34 of the lens holder 54, the cylindrical laser holder 52 is fitted to an outer circumferential step portion of the lens holder 54 to thereby perform alignment in the z direction. On the other hand, the base portion 20c of the semiconductor laser 20 is brought into contact with an end surface of the laser holder 52 to thereby perform alignment in the x and y directions. The position of the semiconductor laser 20 is adjusted while light emitted from the semiconductor laser 20 is monitored through the single mode optical fiber of the optical plug. In the condition that the semiconductor laser 20 is positioned as described above, fixation between the laser holder and the lens holder, and fixation between the semiconductor laser and the laser holder are performed by an adhesive agent or the like.

The example shown in FIG. 4 is configured so that the laser chip 20a does not come into contact with the rod lens 22 (the distance between the laser chip 20a and the rod lens 22 should not be smaller than a specific value) even if the base portion 20c of the semiconductor laser 20 is pushed deepest into the laser holder 42 (i.e., even if the distance restriction surface 20cS of the base portion 20c is brought into abutment with the distance restriction surface 42S of the laser holder 42). The example shown in FIG. 5 is configured so that the laser chip 20a does not come into contact with the rod lens 22 (the distance between the laser chip 20a and the rod lens 22 should not be smaller than a specific value) even if the laser holder 52 is pushed deepest into the lens holder 54 (i.e., even if the distance restriction surface 52s of the laser holder 52 is brought into abutment with the distance restriction surface 54S of the lens holder 54). In this manner, failure can be prevented from being caused by careless contact.

Although all the aforementioned examples have shown a receptacle type structure in which connection is performed by use of an optical plug, it is a matter of course that the present invention can be applied also to a pigtail type structure in which an optical fiber ferrule is fixed directly.

As described above, in accordance with the present invention, the gradient index rod lens has a light source side end surface shaped like a convex spherical surface, and an optical fiber side end surface shaped like a flat surface. The gradient index rod lens is contained in a housing in the condition that a light source and the lens are disposed close to each other. Hence, eclipse of emitted light can be reduced, so that the coupling loss between the light source and an optical fiber can be reduced. Thus, semiconductor laser-single mode optical fiber coupling can be achieved with high efficiency.

Because not an aspherical lens but a spherical lens is used as the lens in the present invention, a spherical surface processing method heretofore used can be used. Hence, a press mold is not required, so that the lens can be mass-produced easily and inexpensively. Thus, it is possible to obtain a light source-optical fiber coupler which can couple a semiconductor laser to a single mode optical fiber with a small loss (efficiently) and which is small in size and inexpensive.

What is claimed is:

1. A light source-optical fiber coupler comprising:
    a light source; and
    a gradient index rod lens for coupling diffuse luminous flux emitted from said light source to an end surface of an optical fiber;
    wherein said gradient index rod lens has a light source side end surface shaped like a convex spherical surface, and an optical fiber side end surface shaped like a flat surface; and
    wherein said gradient index rod lens has a structure in which said gradient index rod lens is retained by a housing wherein said gradient index rod lens is disposed close to a laser chip of a semiconductor laser used as said light source and in which said optical fiber can be retained by said housing, and
    wherein a distance between a surface of said laser chip and the end surface of said gradient index rod lens is not larger than 0.3 mm.

2. A light source-optical fiber coupler according to claim 1 wherein: said housing includes a laser holder for retaining said semiconductor laser, and a lens holder for retaining said gradient index rod lens; and a position of said semiconductor laser and a position of said gradient index rod lens can be adjusted in an axial direction of an optical axis as well as in an in-plane direction perpendicular to said optical axis and are limited by said laser holder so that a distance between said laser chip and said gradient index rod lens is not smaller than a predetermined value when the position of said laser chip and the position of said gradient index rod lens are adjusted in said axial direction.

3. A light source-optical fiber coupler according to claim 1 wherein the gradient index rod lens has an effective radius $r_0$ in the range of about 0.3 mm to about 1.0 mm.

4. A light source-optical fiber coupler according to claim 1 wherein there is no cover glass or cap between the laser chip and gradient index rod lens.

5. A light source-optical fiber coupler comprising:
    a housing;
    a semiconductor laser held by said housing, said semiconductor laser chip having an exposed laser chip;
    a gradient index rod lens having a convex spherical end surface and a flat end surface opposite from said convex spherical end surface;
    wherein said gradient index rod lens is held by said housing so that a distance between said laser chip of said semiconductor laser and said convex spherical end surface is 0.3 mm or less.

6. A light source-optical fiber coupler according to claim 5, further comprising:
    a receptacle portion, disposed on said housing, for receiving an optical fiber, whereby said coupler constitutes a receptacle type structure.

7. A light source-optical fiber coupler according to claim 5, further comprising:
    an optical fiber held by said housing, whereby said coupler constitutes a pigtail type structure.

8. A light source-optical fiber coupler according to claim 5, wherein said semiconductor laser includes a base portion having a first distance restriction surface, and said housing includes a laser holder having a second distance restriction surface confronted with said first distance restriction surface.

9. A light source-optical fiber coupler according to claim 5, wherein said housing includes a laser holder having a third distance restriction surface, and a lens holder having a fourth distance restriction surface confronted with said third distance restriction surface.

10. A light source-optical fiber coupler according to claim 5 wherein the gradient index rod lens has an effective radius $r_0$ in the range of about 0.3 mm to about 1.0 mm.

11. A light source-optical fiber coupler according to claim 5 wherein there is no cover glass or cap between the laser chip and gradient index rod lens.

* * * * *